United States Patent Office 3,373,109
Patented Mar. 12, 1968

3,373,109
CRYSTALLINE ALUMINOSILICATE CATALYST
Vincent J. Frilette, Cherry Hill Township, Camden County, N.J., and Russell W. Maatman, Sioux Center, Iowa, assignors to Mobil Oil Corporation, a corporation of New York
No Drawing. Continuation-in-part of application Ser. No. 774,124, Nov. 17, 1958. This application Oct. 29, 1963, Ser. No. 319,639
8 Claims. (Cl. 252—455)

This application is a continuation-in-part of application Serial No. 774,124, filed Nov. 17, 1958 and now abandoned.

This invention relates to a novel catalyst and to a method for preparing such a catalyst. More particularly, the present invention is directed to a catalytic composition made up of a crystalline inorganic aluminosilicate zeolite characterized by rigid three-dimensional networks and uniform interstitial dimensions, this zeolite containing therewithin a minor proportion of a metal and/or ions of such metal, the metal being one which is capable of forming a Werner complex. The invention also relates to a method for preparing such a catalytic composition.

Crystalline inorganic aluminosilicate zeolites, frequently referred to as "molecular sieves," have long been known to occur naturally. Such naturally occurring zeolites appear in a wide variety of crystallographic forms, e.g., heulandite, sodalite, gmelinite, faujasite, and the like. Such minerals all have in common a structure characterized by rigid three-dimensional networks composed of silicon, aluminum and oxygen atoms arranged in a variety of ways, but always such that the crystals possess interstitial channels communicating with cavities, which channels and cavities are, in the natural state, filled by water. These channels also contain mobile cations, the most characteristic of which are sodium and calcium ions.

More recently it has become known that many of the naturally occurring crystalline aluminosilicates can be synthesized. Moreover, many crystalline aluminosilicates not found in nature have been successfully synthesized. Such a synthesis is generally effected by mixing together a silicon-containing compound such as a sodium metasilicate and an aluminum-containing compound such as sodium aluminate. Thereafter, the formation of a synthetic crystalline or cryptocrystalline aluminosilicate is induced by subjecting the aqueous slurry to a controlled heating.

Syntheses of a number of types of crystalline aluminosilicates are presently being conducted on a commercial scale, for the resulting products have found application in a variety of industrial processes, e.g., drying, purification, catalysis, and the like.

A considerable number of different catalytic properties have been found to be attributable to crystalline aluminosilicates. For example, crystalline aluminosilicate salts have been found to be effective in catalyzing various reactions such as cracking, polymerization, alkylation, isomerization, and the like. It is also known that crystalline aluminosilicates possess the ability to promote the oxidation of various carbon-containing compounds. It has further been reported that, by appropriate selection of particular crystallographic species of crystalline aluminosilicate, a "sieve-like" effect is attainable, whereby only certain molecules within a mixture of reactable components are actually reacted.

The foregoing catalytic properties associated with crystalline aluminosilicates appear to be dependent less upon the chemical composition of the aluminosilicate than upon the particular crystalline organization of the constituent atoms making up such aluminosilicate.

It is also known that the catalytic properties of crystalline aluminosilicates can be altered by introducing into the interstitial channels and cavities thereof one or more catalytically active materials. Such introduction, as heretofore described, involves first effecting crystal formation of the aluminosilicate and thereafter introducing therein the appropriate catalytically active material. The resulting catalyst will generally exhibit a catalytic activity which is at least in part attributable to the migratory catalytically active material so introduced.

The present invention provides a catalytic composition made up of a crystalline aluminosilicate zeolite characterized by rigid three-dimensional networks and uniform interstitial dimensions, which zeolite contains therein a metal and/or ions of such metal, which metal is one which is capable of forming a Werner complex. Such a zeolite results from the growth of crystals of the zeolite from an aqueous medium containing a water-soluble compound of the metal.

The catalytic compositions of this invention exhibit remarkable catalytic properties. For example, such compositions are suitable for catalyzing oxidation, hydrogenation, cracking, isomerization, etc. One particularly desirable property of certain of the catalytic compositions of this invention is an ability to selectively operate on only certain components of a given charge feed, e.g., to effect selective oxidation wherein only certain components of a charge are oxidized while the remainder are unaffected. Moreover, the presence of a minor amount of a specified metal and/or ions from such metal in the catalytic compositions has been found, in many instances, to introduce new catalytic properties or to alter certain of the catalytic properties, without substantially affecting other catalytic properties. Thus, oxidation activity may be imparted to a crystalline aluminosilicate zeolite by virtue of having effected crystallization in the presence of a metal compound wherein the metal is one which is capable of forming a Werner complex, without affecting the cracking activity of such zeolite. This permits more efficient coke burning and regeneration of spent cracking catalyst.

The catalytic compositions of the present invention are generally characterized by the fact that the minor amount of metal and/or ions thereof contained within the crystalline aluminosilicate zeolite is strongly bound or "fixed" therein. Thus, once incorporated, the metal and/or metal ions are not easily removed. For instance, conventional techniques for ion removal or ion exchange, such as washing or base exchange, are usually ineffectual. It will therefore be seen that the catalytic compositions of the present invention are to be distinguished from those catalysts known heretofore and which are made up of aluminosilicate zeolites wherein a metal or metallic ion has been introduced into the crystalline zeolite after crystallization, e.g., by means of base-exchange or the like.

In accordance with one aspect of the invention there is provided a catalytic composition of a crystalline aluminosilicate zeolite characterized by rigid three-dimensional networks, uniform interstitial dimensions, and containing therein a minor amount of a metal and/or ions of such metal, the metal being one capable of forming a Werner complex, said zeolite resulting from the growth of crystals of said zeolite from an aqueous medium containing a water-soluble compound of the foregoing metal.

Another aspect of this invention resides in a method of preparing a catalytic composition of a crystalline aluminosilicate zeolite containing a minor proportion of a specified metal and/or ions of said metal within its crystal structure, this method comprising introducing into an aqueous reaction mixture capable of forming a crystalline aluminosilicate zeolite, a minor proportion of a water-soluble ionizable metal compound, the metal of such metal compound being capable of forming a Werner complex, inducing crystallization of such mixture in the presence of the metal compound, and dehydrating the resulting crystalline product. A further aspect comprises subjecting the foregoing crystalline product to thermal treatment at a temperature of from about 250 to 1100° F. to thereby effect at least a partial conversion of metal-containing ions to a catalytically active state. Yet another aspect involves, during the foregoing thermal treatment at from about 250 to 1100° F., subjecting the crystalline product to hydrogenation to thereby reduce at least some of the metal-containing ions to free metal.

Another aspect of this invention is the provision of a catalytic composition made up of a crystalline aluminosilicate zeolite characterized by rigid three-dimensional networks and uniform pores not in excess of about 6 angstroms in diameter, which zeolite contains dispersed within the pores thereof a minor amount of metal, such metal being one capable of forming a Werner complex.

Yet another aspect of the present invention resides in a method of preparing a catalytic composition which comprises introducing into an aqueous reaction solution having a composition, expressed as mixtures of oxides, within the following ranges: $SiO_2/Al_2O_3$ of 0.5 to 2.5; $Na_2O/SiO_2$ of 0.8 to 3.0; $H_2O/Na_2O$ of 35 to 100; a minor proportion of a water-soluble ionizable metal compound, the metal of such compound being one which is capable of forming a Werner complex, inducing crystallization of the resulting reaction mixture by subjecting such mixture to hydrothermal treatment, and drying the material so obtained. It is preferred to then subject the dried crystalline material to thermal treatment at a temperature of from about 250 to 1100° F. to effect at least a partial conversion of metal-containing ions to a catalytically active state.

A further aspect of the present invention resides in a method for preparing a catalytic composition which comprises introducing into an aqueous reaction solution having a composition, expressed in mixtures of oxides, within the ranges $SiO_2/Al_2O_3$ of 0.5 to 2.5; $Na_2O/SiO_2$ of 0.8 to 3.0; $H_2O/Na_2O$ of 35 to 200; a minor proportion of a water-soluble ionizable metal compound, the metal of such compound being one which is capable of forming a Werner complex, inducing crystallization of the resulting reaction mixture by subjecting it to hydrothermal treatment, replacing sodium ions of the resulting crystalline product with calcium, drying the resulting material and thermally treating such material at a temperature of from about 250 to 1100° F. to effect at least partial conversion of metal-containing ions to a catalytically active state, thereby yielding a composition having a minor amount of such metal dispersed within the pores of a crystalline aluminosilicate characterized by rigid three-dimensional networks and uniform pores not in excess of about 6 angstroms in diameter.

Yet a further aspect of the invention resides in a method of preparing a catalytic composition by introducing into a reaction mixture of sodium aluminate and sodium metasilicate, a minor proportion of an ionizable metal compound in which the metal is present in the cationic or anionic form, the metal of such compound being one capable of forming a Werner complex, inducing crystallization of the resulting reaction mixture by subjecting it to hydrothermal treatment at a temperature of from about 21 to 150° C., and drying the resultant crystalline material to yield a crystalline aluminosilicate characterized by rigid three-dimensional networks and uniform pores and containing therein the foregoing metal and/or ions of such metal.

Still another aspect of this invention provides a method similar to that described in the immediately preceding paragraph, but such method additionally provides for treating the catalytic material, after the drying thereof, in an atmosphere containing free oxygen at a temperature within the approximate range of within 250 to 1100° F. from about ¼ to 24 hours and thereafter in an atmosphere of hydrogen at a temperature within the previously defined range to effect at least a partial reduction of the metal ions to free metal, so that the resulting composition is characterized by uniform pores not in excess of about 6 angstroms in diameter, such composition containing dispersed within said pores the foregoing metal.

In general, the synthetic crystalline aluminosilicates or cryptocrystalline aluminosilicates of this invention are prepared by methods and recipes similar to those described in the art. For example, the proportions of alkali or alkaline earth metal, silicon-containing, and aluminum-containing compounds; the specific compounds used; and the temperatures and times of treatment described in U.S. 2,413,134 for the preparation of analcite, and leucite, and in U.S. 2,882,243 for the preparation of zeolite-A, and in U.S. 2,882,244 for the preparation of zeolite-X, and in U.S. 2,911,285 for the manufacture of synthetic sodalite, and in U.S. 2,950,952 for the manufacture of crystalline zeolite-T, and in U.S. 2,962,355 for the manufacture of crystalline zeolite-E all are applicable, with the added metal compound introduced *prior* to crystallization. Also applicable are the various preparational methods described in the literature by such well-known authorities as R. M. Barrer for the preparation of synthetic mordenite, faujasite, heulandite, etc.

The crystalline aluminosilicate zeolites employed in preparation of the catalyst described herein are adsorbents designated as molecular sieves. Molecular sieves are essentially the dehydrated forms of crystalline natural or synthetic hydrous siliceous zeolites containing varying quantities of sodium, calcium or aluminum with or without other metals. All or a portion of the sodium or calcium ions normally contained in the molecular sieve structure may be zeolitically replaced with a number of various other ions. The atoms of sodium, calcium or metals in replacement thereof, silicon, aluminum, and oxygen in these zeolites are arranged in the form of aluminosilicate salts in a definite and consistent crystalline pattern. This structure contains a large number of small cavities interconnected by a number of still smaller holes or channels. These cavities and channels are precisely uniform in size. Chemically, these zeolites may be represented by the general formula:

$$Me_{x/n}[(AlO_2)_x(SiO_2)_y] \cdot zH_2O$$

where Me is a metal cation, $x/n$ is the number of exchangeable cations of valence, $n$, $x$ is also the number of aluminum atoms combined in the form of aluminate, $y$ is the number of silicon atoms and $z$ is the number of water molecules, removal of which produces the characteristic channel system. In the above formula, the ratio $y/x$ is a number from 1 to 5 and usually 1 to 2. At the present time, there are commercially available molecular sieves of the "A" series and of the "X" series. A synthetic zeolite known as "Molecular Sieve 4A" is a crystalline sodium aluminosilicate having channels about 4 angstroms in diameter. In the hydrated form, this material is chemically characterized by the formula:

$$Na_{12}(AlO_2)_{12}(SiO_2)_{12} \cdot 27H_2O$$

The synthetic zeolite known as "Molecular Sieve 5A" is a crystalline aluminosilicate salt having channels about 5 angstroms in diameter and in which substantially all of the 12 ions of sodium in the immediately above formula are replaced by calcium, it being understood that calcium replaced sodium in the ratio of one calcium ion for two sodium ions. A crystalline sodium aluminosilicate which had pores or channels of approximately 13 angstrom units in diameter is also available commercially under the name of "Molecular Sieve 13X." The letter "X" is used to distinguish the interatomic structure of this zeolite from that of the "A" crystal mentioned above. As prepared, the 13X material contains water and has the unit cell formula $$Na_{86}[AlO_2)_{86}(SiO_2)_{106}] \cdot 267H_2O$$

The 13X material is structurally identical with faujasite, a naturally occurring zeolite. Faujasite, however, is not identical in composition with the 13X zeolite. The synthetic zeolite known as "Molecular Sieve 10X" is a crystalline aluminosilicate salt having channels about 10 angstrom units in diameter and in which a substantial proportion of the sodium ions of the 13X material have been replaced by calcium.

Molecular sieves of the "A" series consist fundamentally of a tetrahedral three dimensional structure of silicon and aluminum. These tetrahedra are joined by sharing oxygen atoms in such a manner that the ratio of atoms of oxygen to the total number of atoms of aluminum and silicon is equal to two. The electrovalence of the tetrahedra containing aluminum is balanced by the inclusion in the crystal of a cation, for example, an alkali metal or an alkaline earth metal cation. This equilibrium can be expressed by the formula wherein the ratio of $Al_2$ to the number of the cations such as Ca, Sr, $Na_2$, $K_2$ or $Li_2$ is equal to unity. One cation may be exchanged either in entirety or partially by another cation utilizing ion exchange techniques. The spaces between the tetrahedra are occupied by molecules of water prior to dehydration.

Molecular sieves of the "A" series are ordinarily prepared initially in the sodium form of the crystal. The sodium ions in such form may, as desired, be exchanged for other cations. In general, the process of preparation involves mixing an aluminum-containing salt with a silicon-containing salt to form an amorphous precipitate. Usually, sodium aluminate and sodium silicate are employed. Thereafter, the resulting precipitate is heated in aqueous solution to induce crystallization thereby forming the crystalline inorganic zeolite. The temperature of such hydrothermal treatment is generally about 100° C. and the time of such treatment is usually between about 15 minutes and 90 hours or more. The product which crystallizes within this hot mixture is separated therefrom and water washed until the water in equilibrium with the zeolite has a pH in the range of 9 to 12, and thereafter dehydrated by heating.

Suitable reagents in the preparation of the sodium zeolite of the "A" series include silica gel, silicic acid, or sodium silicate as sources of silica. Alumina can be supplied by utilizing activated alumina, gamma alumina, alpha alumina, aluminum trihydrate or sodium aluminate. Sodium hydroxide is suitably used as a source of the sodium ion and in addition contributes to the regulation of the pH. All reagents are preferably soluble in water. The reaction solution has a composition, expressed as mixtures of oxides, within the following ranges $SiO_2/Al_2O_3$ of 0.5 to 2.5, $Na_2O/SiO_2$ of 0.8 to 3.0 and $H_2O/Na_2O$ of 35 to 200. The reaction mixture is placed in a suitable vessel which is closed to the atmosphere in order to avoid losses of water and the reagents are then heated for an appropriate length of time. A convenient and generally employed process of preparation involves preparing an aqueous solution of sodium aluminate and sodium hydroxide and then adding with stirring an aqueous solution of sodium silicate. While satisfactory crystallization may be obtained at temperatures from 21° C. to 150° C., the pressure being atmospheric or less corresponding to the equilibrium of the vapor pressure with the mixture at reaction temperature, crystallization is ordinarily carried out at about 100° C. For temperatures between room temperature (21° C.) and 150° C. an increase in temperature increases the velocity of the reaction and thus decreases its duration. As soon as the zeolite crystals are completely formed they retain their structure and it is not essential to maintain the temperature of the reaction any longer in order to obtain a maximum yield of crystals.

After formation the crystalline zeolite is separated from the mother liquor usually by filtration. The crystalline mass is then washed, preferably with distilled water and while on the filter, until the wash water in equilibrium with the zeolite reaches a pH of 9 to 12. The crystals are then dried at a temperature between 25° C. and 150° C.

As indicated hereinabove, the sodium ions of the above zeolite may be replaced partially or completely by other cations. These replacing ions include other monovalent or divalent cations such as lithium and magnesium, metal ions of the first group of the Periodic Table such as potassium and silver, metal ions of the second group such as calcium and strontium, and other ions including cobalt and ammonium which, with the sodium zeolite of the "A" series, react as a metal in that they replace sodium ions without occasioning any appreciable change in the fundamental structure of the crystalline zeolite. Replacement is suitably accomplished by contacting the crystalline sodium aluminosilicate zeolite with a solution of an ionizable compound of the ion which is to be zeolitically introduced into the molecular sieve structure for a sufficient time to bring about the extent of desired introduction of such ion. After such treatment, the resulting exchanged product is water-washed and dried. The extent to which exchange takes place can be controlled. Thus, taking the exchange of sodium for calcium as a typical example, such exchange can be effected in a proportion of less than 5 percent up to 100 percent by contacting a known amount of the sodium zeolite with solutions containing determined amounts of exchangeable ions.

Sodium zeolite of the "A" series exchanged with calcium or magnesium possesses larger pores than the unexchanged material. An unusual characteristic of the calcium or magnesium exchanged zeolites is that the opening of the pores is not accomplished progressively as the sodium ions are replaced by calcium ions but is produced within a fairly narrow range of composition. When the exchange is 25 percent or less, the substance possesses substantially the same pore characteristics as the sodium zeolite of the "A" series, namely a pore diameter of about 4 angstrom units. However, when the exchange exceeds 40 percent, the pore characteristics become those of the calcium and magnesium zeolites of the "A" series, i.e., a pore diameter of about 5 angstrom units.

As noted hereinabove, there are numerous forms of zeolites of the "A" series having exchanged ions. While, generally, the substances having a divalent exchanged ion such as magnesium and strontium zeolites, have pore size characteristics analogous to those of calcium of the "A" series, the exact pore size will differ. Such property can be advantageously employed in affording control of pore size by suitable selection of a particular cation. Similarly, the substances having a monovalent ion such as lithium and silver zeolites of the "A" series have pore size characteristics similar to the sodium zeolite of such series, but the precise pore size is subject to similar control and selection.

While the preparational methods for producing different crystalline aluminosilicates vary widely, they all in common have the feature that the reactants are co-mingled to form a non-crystalline intermediate, which may be a slurry, gel, or mixture, in aqueous medium, and thereafter the intermediate is subjected to further treatment or treatments, usually at elevated temperature, but not necessarily so, and for various periods of time, to convert the amorphous substance into a crystalline or cryptocrystalline product which is a member of the class of minerals hereinabove described.

In the practice of the present invention, catalytically novel properties are imparted to the crystalline products by the inclusion of minor amounts of a metal compound at a point in the procedure prior to inducing crystallization in aqueous medium of the amorphous solid, gel, or suspension. While a wide variety of metal compounds and quantities of these may be used, it is preferred that the compounds and amounts selected be such that they do not in general substantially alter the crystallizability of the amorphous precursors. In general, the amount of metal compound should be less than 10 weight percent of the total recoverable solids of the aqueous slurry, and preferably less than 1 percent. In special cases, the novel crystalline aluminosilicates of this invention may be prepared by using greater than 10 weight percent. In such instances, however, in order to preserve the crystallizability of the amorphous intermediate it may be necessary to withdraw a portion of one of the other ingredients.

The metal compounds of this invention may be derived from a wide variety of metals, preferably from those metals which form Werner complexes. In its general form, the chemical structure of the metals as complexes may be represented by $$[(M^n)a_x b_y c_z d_w]^m$$

in which M is the metal, $n$ is the valence state of the metal, which may vary from $+1$ to $+6$, $a$, $b$, $c$, $d$ are coordinated groups which may be capable of free existence as neutral species, such as $H_2O$, $NH_3$, or ethylene diamine, or negative species, such as Cl, OH, $SO_4$, and in which $x$, $y$, $z$, and $w$ are numbers which may vary from 0 to 8, but in which the sum of $x+y+z+w$ is 8 or less and $m$ is the resultant arithmetic electrostatic charge in the neighborhood of the complex, which is identical with $n$ when the coordinating species, $a$, $b$, $c$, and $d$ are neutral, or may vary from $n$ to $-6$ when the coordinating species bear a negative charge. Thus, in the preferred form of this invention, the metal compound to be added contains the metal in the form of a complex cation, a neutral complex species, or a complex anion.

It is preferred in the practice of this invention to employ compounds of those metals selected from Groups II-B, III-B, IV-B, V-B, VI-B, VII-B, and Group VIII of the Periodic Table. Particularly preferred are metal compounds wherein the metal is platinum, manganese, iron, vanadium, chromium, molybdenum, titanium, cobalt, nickel, copper, and palladium.

As will be recognized, the metal complexes of this invention and their compounds cover a very wide range in the stability spectrum. Also, some of these are very easily formed and others form only with great difficulty. For those which are very easily formed under reaction conditions, that is under conditions required for conversion of the amorphous intermediate to crystalline or cryptocrystalline solids, the metal need not be added as the complex compound but may be added in a more simple form, such as a simple salt, the complex compound being formed in situ. In other cases, it is preferred that the complex compound be formed externally to the reaction mixture and added thereto at some stage prior to the crystallization.

In one embodiment for the practice of this invention, a small amount of metal in the form of stable complex cations is added to the mixture prior to crystallization. It is preferred, in this method, that the crystallizing mixture be so selected as to give a crystalline aluminosilicate product with the regular channels accessible to molecules with about 6 angstroms or less critical diameter. In such instances, the stable complex cation can neither penetrate the interstitial voids of the crystal from the outside, nor can it leave the interstitial spaces once it is included within the interstitial channels of the crystal. As a specific example, the A-type aluminosilicate, formed in the presence of tetrammine platinous chloride, is found to contain platinum, probably in cationic form, which, however, cannot be base exchanged out of the final crystal. Such a crystal, formed in the absence of added metal compound, is found not to base exchange with a solution of tetrammine platinous chloride. Thus, it is believed in this instance that a type of novel material which may be generally classified as a "clathrate" compound of the stable metal complex is formed. On the other hand, should a crystal of the faujasite family be taken, it is found that this crystal very readily will exchange extensively with tetrammine platinous chloride, and by the same token, a preparation made by crystallization in the presence of this platinum complex will be found to lose platinum if treated with sodium chloride solution.

Another embodiment for the practice of this invention is to conduct the crystallization of a crystallizable alumino-silicate slurry in the presence of an anionic complex of a metal compound. Such compounds, for example, as chloroplatinic acid, sodium ferrate, potassium permanganate, and others, may be used. Thus, the metal portion of the complex metal anion is typically platinum, iron, manganese, cobalt, molybdenum, chromium, vanadium, titanium, or the like. In these instances, it is believed that there is occasional *substitution* of one of the tetrahedra of either silicon or aluminum by the complex metal anion. This "defect" structure so produced is believed responsible for some of the remarkable catalytic properties of the resulting products. When anionic complexes are sparingly soluble, we have found that a soluble salt of the metal in cation form may be introduced into the system at the moment of aluminosilicate gel formation. At this instant the metal salt reacts with the excess hydroxyl ion present to form a metal hydroxide gel or precipitate mingled with the aluminosilicate particles. Products prepared in this manner usually show no inhomogeneity under microscopic examination. Furthermore, after crystallization, it is found that the incorporated metal is catalytically active beyond what would be expected from the amounts incorporated, thus indicating that the added metal has effectively been introduced into the rigid anionic lattice of the structure.

Another embodiment for the practice of this invention is to replace part or all of the alkali metal aluminate in recipes calling for addition of such material by the sodium salt of an anionic complex of the metal. One example, for instance, is the preparation of the A-type zeolite in which sodium chromate replaces about half of the sodium aluminate.

As previously noted, in the preferred aspects of this invention, the products are characterized by the fact that the added metal compound is at least in part extremely strongly bound, i.e., the added metal content is not removed readily by rinsing or the usual base exchange procedures.

The products of this invention should not be confused with crystals to which catalytic elements are added after crystallization. This is illustrated by the following:

A sample of 13X crystalline aluminosilicate was prepared containing 2600 p.p.m. iron by crystallization from an amorphous slurry to which sodium ferrate had been added. Oxidative conversion of CO over this catalyst was at least three times as effective as that over a catalyst prepared by addition of ferrous sulfate to a crystalline preparation after crystallization, even though both preparations had the same content of iron.

The catalytic compositions of the invention are prepared by introducing a water-soluble metal compound, wherein the metal is one capable of forming a Werner complex, into a zeolite-forming reaction mixture prior to crystallization of the zeolite product and thereafter inducing crystallization of the zeolite by subjecting the reaction mixture to hydrothermal treatment, and dehydrating the resulting product. Desirably thereafter such product is subjected to thermal treatment at a temperature in the approximate range of 250° F. to 1100° F. to effect at least partial conversion of the metal content to a catalytically active state.

Introduction of the metal compound to the zeolite-forming reaction mixture may be made by the addition of such compound to one of the reactants used in preparation of the forming mixture. Alternatively, the metal compound may be introduced by addition to the already formed zeolite reaction mixture, either before or after precipitation of the amorphous slurry. It is, however, essential that the metal compound be present in the reaction mixture before crystallization of the zeolite takes place in order that crystals of the zeolite may grow in the presence of the metal compound. It is contemplated that the specific reagents, amounts and concentrations for the aluminous and siliceous salts and other reagents used in preparation of the zeolite employed herein are the same as those heretofore conventionally employed for the preparation of the above-described molecular sieve zeolites in the absence of a metal compound. Likewise, the conditions for inducing crystallization of the resulting initially formed amorphous precipitate are contemplated to be the same as those heretofore employed for preparation of the crystalline zeolites in the absence of metal compound.

Where the metal compound employed contains a metal of the platinum series, the metal may be platinum, palladium, iridium, rhodium, ruthenium, or osmium. Of this group platinum and palladium are accorded preference. Each of the platinum metals may occur in a variety of compounds. The compounds of the useful platinum metals may be subdivided into compounds in which the metal is present in the neutral state, compounds in which the metal is present in the cation of the compound and compounds in which it is present in the anion of the compound. All of the foregoing types of compounds, that is types which contain the metal in the neutral, cationic or anionic state may be used. It is, however, a preferred aspect of the method of the invention to employ ionizable platinum metal compounds in which the metal is in the cationic state, i.e., in the form of a cation or cation complex, since the catalyst products prepared with the use of such compounds and particularly compounds in which platinum metal is present in divalent cationic form, exhibited marked catalytic selectivity. Thus, suitable metal compounds of the platinum series include:

$[Pt(NH_3)_6]Cl_4$, $[Pt(NH_3)_5Cl]Cl_3$, $[Pt(NH_3)_4Cl_2]Cl_2$, $[Pt(NH_3)_3Cl_3]Cl$, $[Pt(NH_3)_2Cl_4]$, $[Pt(NH_3)_4]Cl_2$, $[Pt(NH_3)_2Cl_2]$, $[Pt(NH_3)_4](OH)_2$, $[Pt(C_2H_5OH)_2Cl_4]$, $[Pt(C_6H_5CN)_2Cl_4]$, $[Pt(NH_3)_2(CN)_2]$, $[Pt(NH_2-CH_2-CH_2-NH_2)_2]Cl_2$, $[Pd(NH_3)_2(NO_2)_2]$, $[Pd(NH_3)_2(C_2O_4)]$, $[PtCl_2 \cdot CO]$, $[OsCl_2 \cdot 3CO]$.

It is contemplated that water will ordinarily be the solvent for the metal compound used. The concentration of the metal compound in the solution employed may vary widely depending upon the amount of metal and/or metal ions desired in the final composition and on the conditions under which crystallization is effected. An amount of metal compound introduced into the zeolite forming mixture, however, is generally such that the ultimate crystalline zeolite contain therein an amount of metal and/or metal ions, expressed in terms of metal, from about 0.001 percent to about 5 percent by weight, and more usually between about 0.001 percent and about 2 percent by weight.

After the contact period, the resulting crystalline zeolite containing metal and/or metal ions therein is removed from the forming solution and washed with water. The resulting material is then dried, generally in air, to remove substantantially all of the water therefrom.

The dried material may be desirably subjected to an activating treatment to render the final composition catalytically active. Such treatment involves heating the dried material at a temperature in the approximate range of 250° F. to 1100° F. to effect at least partial conversion of the metal content to a catalytically active state. In a preferred aspect of the invention, the dried material is subjected to treatment in an atmosphere containing free oxygen, such as air, at a temperature within the approximate range of 250° F. to 1100° F. for from about ¼-hour to 24 hours and thereafter in an atmosphere of hydrogen at a temperature within the above range to effect at least partial reduction of metal-containing ion to free metal.

Where the metal is introduced into the zeolite forming reaction mixture as a stable complex cation, the resulting catalytic compositions are iso-structural with natural zeolites such as leucite, analcite, chabazite and the hereinabove described synthetic zeolites of the "A" series. All of these structures have uniform pore diameters of about 5 angstrom units or less and usually do not readily exchange cationic metal to form highly selective catalytic substances. By contrast, although synthetic faujasite-like compositions may be prepared in accordance with the method described herein, such compositions have sufficiently large pores to permit ready exchange with metals in the cationic form and accordingly more readily lend themselves to preparation in accordance with the method described in our co-pending application Serial No. 774,143, filed November 17, 1958. Of course, a zeolite-forming mixture resulting in a faujasite-like composition can be employed with an *anionic* metal complex whereby the metal content so introduced will enter into and become a part of the crystal lattice, and hence will remain "fixed" or "bound" with the zeolite so that it will resist removal, e.g., by washing or base exchange.

The small pore catalytic compositions of one embodiment of the present invention, i.e., pore size not exceeding about six angstrom units, may be base-exchanged without substantial loss of metal from the solid. Such exchange preferably is carried out prior to drying but after crystallization of the zeolite, thus avoiding fixation of metal on the external crystal surfaces with accompanying substantial loss of geometrical selectivity.

A particularly advantageous catalytic composition is one consisting essentially of a metal dispersed within the pores of a crystalline zeolite structure characterized by rigid three-dimensional networks and uniform pores approximately 5 angstroms in diameter. Suitable metals which can be so dispersed include metals of the platinum series (platinum and palladium being preferred), copper, nickel, iron, cobalt, and manganese.

Such a composition is iso-structural with Molecular Sieve 5A described hereinabove. Such material is catalytically active and also very selective. The selectivity is believed attributable to the uniform pore structure of the composition affording exclusion of branched-chain molecules from the very narrow channels having a pore diameter of about 5 angstrom units. Thus, the channels in such composition permit adsorption of normal paraffins and olefins having a molecular size smaller than 5 angstroms while excluding molecules of a size larger than 5 angstroms such as for example, iso-paraffins, iso-olefins, and cyclic hydrocarbons. It is accordingly believed that the metal activity sites are shielded from molecules exceeding a certain critical diameter, permitting the catalytic compositions described herein to exhibit high activity for selected members of a hydrocarbon class. Such selective high activity is accordingly restricted to those molecules which do not exceed a maximum critical diameter corresponding to the particular pore size of the crystalline zeolite. It appears that the major portion of the distributed metal is situated within the crystals of the zeolite and that the crystals of the zeolite admit or reject a reactant molecule depending upon whether or not the diameter of the molecules exceeds the size of the opening in the crystal face. Thus, it appears that a molecule which cannot enter the crystal cannot undergo any substantial reaction.

There are numerous applications for the crystals of the present invention. For example, in the manufacture of isoprene for synthetic rubber, the presence of butadiene and piperylene are undesirable contaminants. Such materials may be readily and selectively hydrogenated to innocuous paraffins without changing the isoprene, a branched olefin, by contact with the catalyst consisting essentially of a metal, e.g., platinum, dispersed within the pores of a crystalline zeolite structure characterized by rigid three-dimensional networks and uniform pores approximately 5 angstroms in diameter. A particular example of the size selectivity exhibited by the catalytic compositions of the invention is the ability of such compositions to catalyze the hydrogenation of normal olefins from a mixture of the same containing iso-olefins, and/or cyclic hydrocarbons. Thus, hydrogenation of normal butene, a straight chain compound, may be catalyzed utilizing the above catalytic composition while under the same conditions iso-butene, a branched compound is not hydrogenated.

A composition consisting essentially of a platinum metal dispersed within the pores of a crystalline zeolitic structure characterized by rigid three-dimensional networks and uniform pores approximately 5 angstroms in diameter, is prepared by mixing and heating solutions of sodium aluminate and sodium metasilicate of fixed concentrations as previously described, followed by washing with a calcium compound solution to convert the sodium form to the calcium form of the zeolite.

In accordance with the invention as generally contemplated, a solution of a water-soluble metal compound, the metal thereof being capable of forming a Werner complex, is introduced into a zeolite forming mixture prior to crystallization of the zeolite. The resulting wet crystalline zeolite contaning metal and/or metal ions is thereafter dried and subjected to a thermal treatment. Desirably such thermal treatment involves initial heating in air and thereafter in hydrogen. The finished catalyst is dry and contains in the zeolitic structure a minor amount of metal content, some of which may be in metallic form.

As previously noted, the alkali metal or alkaline earth metal ions present in the zeolite may be replaced partially or completely by other cations utilizing ion exchange techniques. Thus rare earth ions may be so introduced. For example, a cracking catalyst having markedly improved regenerability characteristics can be formed by introducing a water-soluble iron or chromium compound into a synthetic faujasite-forming mixture prior to crystallization, effecting crystallization, and then exchanging with a solution containing rare earth ions to introduce rare earth ions into the zeolite. Thereafter the zeolite is dried and subjected to thermal treatment as heretofore described. Of course, rather than utilizing ion exchange techniques, the zeolite may be impregnated with other cations such as rare earth ions and the like.

The following examples will further illustrate this invention.

Examples 1–19 hereinafter illustrate the preparation of faujasite-types of zeolitic compositions made up of pores approximately 13 angstroms in diameter. Each such zeolite contained metals or metal ions introduced in the anionic portion of a reagent utilized to prepare such zeolite.

EXAMPLE 1

In a porcelain evaporating dish was placed 0.7 gram sodium hydroxide pellets and 0.6 gram manganese dioxide. These materials were carefully fused and after cooling, the solid product was extracted with 10 ml. "deionized" distilled water.[1] This completed the preparation of sodium manganate solution.

A solution prepared by dissolving 18.5 grams sodium aluminate (75% assay) in 150 ml. deionized distilled water was filtered through a fluted filter paper into a polypropylene beaker. A similar solution was prepared by dissolving 84 grams of sodium metasilicate nonahydrate in 250 ml. deionized water and filtering.

The aluminate and silicate solutions were poured rapidly together into a polypropylene beaker containing the manganate solution. The mixture was stirred for two minutes to insure complete mixture, and then was allowed to stand at 100° C. for 8 hours. During this time crystallization took place as indicated by gradual settling of the solids in the beaker. The solids were removed from the crystallization media by filtration through a No. 42 Whatman paper on a polypropylene Buchner funnel. The filter cake was washed with 1000 ml. deionized distilled water and the washed solids were placed in a muffle furnace for 20 hours at 350° C. The product was a gray powder with a yield of 21.93 grams. The product analyzed as follows:

| | | |
|---|---|---|
| Water sorption | weight percent | 33.4 |
| Cyclohexane sorption | do | 18.5 |
| Manganese (as Mn metal)[1] | do | 0.49 |
| Sodium (as Na metal)[1] | do | 13.1 |
| Alumina (as $AlO_2$)[1] | do | 35.8 |
| Silica (as $SiO_2$)[1] | do | 49.5 |
| Crystallinity (X-ray) (based on Linde 13X) | percent | 90 |

[1] In this and all subsequent examples the alumina and silica are reported as $AlO_2$ and $SiO_2$, respectively; the remainder are reported as metal.

A portion of this material was tested in a microcatalytic reactor using a "pulse" technique. At 900° F. catalyst temperature, 12.3% $CO_2$ was formed from a 10% CO in air mixture. A pulse of 1% n-butane in air under similar conditions gave 2.4% $CO_2$. This compared with 1.6% $CO_2$ from CO and 1.5% from n-butane for a similar sample which served as a "control," and which was prepared without added metal.

EXAMPLE 2

This example was simlar to Example 1, however, a different solution was used to incorporated the manganese. Thus, a permanganate solution containing 1.2 grams potassium permaganate in 15 ml. deionized distilled water was used instead of the sodium manganate solution of Example 1.

Analysis of the product gave the following results:

| | | |
|---|---|---|
| Water sorption | weight percent | 33.1 |
| Cyclohexane sorption | do | 18.3 |
| Manganese | p.p.m | 130 |

EXAMPLE 3

This example was similar to Example 1 with the exception that the solution containing the manganate consisted of: 0.1 gram manganese dioxide; 0.2 gram sodium hydroxide pellets; dissolved in 10 ml. deionized distilled water.

The product recovered (23.6 grams), after drying to 350° C., analyzed as follows:

| | | |
|---|---|---|
| Water sorption | weight percent | 30.5 |
| Cyclohexane sorption | do | 17.7 |
| Manganese | do | 0.29 |
| Sodium | do | 14.6 |
| Alumina | do | 35.8 |
| Silica | do | 49.6 |
| Crystallinity (X-ray) (based on Linde 13X) | percent | 105 |

Oxidation of CO with air over the alumino silicate prepared in this example gave 12.3%, compared to 1.6% $CO_2$ for the control material. In a similar experiment (as described in Example 1, using the pulse technique) n-butane oxidation gave 3.3% $CO_2$, compared to 1.5 for the control.

EXAMPLE 4

This example was similar to Example 2, except that sodium permanganate (trihydrate) was used in place of potassium permaganate.

The crystalline aluminosilicate analyzed as follows:

| | | |
|---|---|---|
| Water sorption | weight percent | 32.0 |
| Cyclohexane sorption | do | 17.9 |
| Manganese | p.p.m | 260 |
| Sodium | weight percent | 13.5 |
| Alumina | do | 36.3 |
| Silica | do | 49.6 |
| Crystallinity (X-ray) (based on Linde 13X) | percent | 115 |

[1] Deionized distilled water was prepared by passing distilled water through an ion exchange column (28 inches long x 2.5 inches diameter, filled with mixed ion exchange resin bed) at a moderate rate. As an index of purity, this water contained less than 1 p.p.m. iron.

EXAMPLE 5

A solution of sodium ferrate was prepared by reacting 20.0 grams sodium hydroxide and 1.4 grams ferric chloride in 40 ml. deionized distilled water, permitting the whole to cool to room temperature, and then passing a slow stream of chlorine gas therethrough for 10 minutes. Gradually the solids were brought into a purple solution.

A solution containing 18.5 grams of sodium aluminate (75% assay) in 150 ml. deionized distilled water was filtered through a fluted filter paper into a polypropylene beaker. A similar solution was prepared by dissolving 84.0 grams sodium metasilicate (nonahydrate) in 250 ml. deionized distilled water. The aluminate and silicate solutions were poured together rapidly into a polypropylene beaker containing the ferrate solution. After mixing to assure complete reaction of components, the mixture was allowed to stand for 9½ hours at 100° C. After cooling, the solids were removed by filtration through a sintered glass funnel, and washed with 1000 ml. deionized distilled water. The resulting tan solids were heated in a muffle furnace for 19 hours at 350° C. The solids (23.02 grams) analyzed as follows:

| | |
|---|---|
| Water sorption _____weight percent__ | 26.2 |
| Cyclohexane sorption _____do____ | 13.7 |
| Iron _____do____ | 1.20 |
| Sodium _____do____ | 14.1 |
| Alumina _____do____ | 38.3 |
| Silica _____do____ | 46.4 |
| Crystallinity (based on Linde 13X) _____percent__ | 70 |

A sample of the material prepared in this example was tested for oxidation activity as described in Example 1. The formation of 13.3% $CO_2$ from CO (compared to 1.6 for the control) and 10.1% $CO_2$ from n-butane (compared to 1.5% for the control) was noted.

EXAMPLE 6

The same method was used as described in Example 5, except that the ferrate solution was prepared in the following proportions:

| | |
|---|---|
| Sodium hydroxide pellets _____grams__ | 5.0 |
| Ferric chloride _____do____ | 0.4 |
| Deionized distilled water _____ml__ | 10 |

The finished product analyzed as follows:

| | |
|---|---|
| Water sorption _____weight percent__ | 30.2 |
| Cyclohexane sorption _____do____ | 17.7 |
| Iron _____do____ | 0.29 |
| Sodium _____do____ | 14.1 |
| Alumina _____do____ | 37.5 |
| Silica _____do____ | 49.6 |
| Crystallinity (X-ray) (based on Linde 13X) percent__ | 100 |

Oxidation carried out via the previously described pulse technique (Example 1) with the catalyst prepared in this example gave 12.5% $CO_2$ from CO and 6.0% $CO_2$ from n-butane. This compared to 1.6% and 1.5%, respectively, for the control.

EXAMPLE 7

This example was similar to Example 5, however the crystallization was carried out in a nitrogen atmosphere in order to exclude air.

The dried product analyzed as follows:

| | |
|---|---|
| Water sorption _____weight percent__ | 24.2 |
| Cyclohexane sorption _____do____ | 11.5 |
| Iron _____do____ | 1.17 |
| Sodium _____do____ | 14.2 |
| Alumina _____do____ | 37.2 |
| Silica _____do____ | 47.5 |
| Crystallinity (X-ray) (based on Linde 13X) percent__ | 45 |

EXAMPLE 8

This example was similar in method to Example 2, except that a vanadate reagent was employed rather than a manganate. The vanadate reagent was prepared as follows: 2.9 grams sodium orthovanadate (hexadecahydrate) were dissolved in 10 ml. deionized distilled water.

After the usual washing and drying to 350° C. the product analyzed as follows:

| | |
|---|---|
| Water sorption _____weight percent__ | 31.4 |
| Cyclohexane sorption _____do____ | 18.0 |
| Vanadium _____p.p.m__ | 16 |
| Sodium _____weight percent__ | 14.7 |
| Alumina _____do____ | 35.5 |
| Silica _____do____ | 48.4 |
| Crystallinity (X-ray) (based on Linde 13X) percent__ | 105 |

EXAMPLE 9

This example was almost identical to Example 8, however the reaction mixture was stirred during crystallization.

The product analyzed as follows:

| | |
|---|---|
| Water sorption _____weight percent__ | 26.7 |
| Cyclohexane sorption _____do____ | 15.8 |
| Vanadium _____p.p.m__ | 101 |
| Sodium _____weight percent__ | 13.2 |
| Alumina _____do____ | 35.5 |
| Silica _____do____ | 49.5 |
| Crystallinity (X-ray) (based on Linde 13X) percent__ | 85 |

EXAMPLE 10

The method used in this example was similar to Example 8, however the sodium orthovanadate was replaced with 1.0 gram sodium metavanadate. After drying at 350° C., the product analyzed as follows:

| | |
|---|---|
| Water sorption _____weight percent__ | 31.3 |
| Cyclohexane sorption _____do____ | 16.9 |
| Vanadium _____p.p.m__ | 26 |
| Sodium _____weight percent__ | 13.6 |
| Alumina _____do____ | 34.9 |
| Silica _____do____ | 49.3 |
| Crystallinity (X-ray) (based on Linde 13X) percent__ | 100 |

EXAMPLE 11

This example was similar to Example 8, however a vanadite solution was utilized rather than sodium metavanadate. The vanadite solution was prepared as follows: 3.46 grams sodium orthovanadate (hexahydrate) in 25 ml. deionized distilled water were treated with a stream of sulfur dioxide gas for 10 minutes at room temperature. The solution turned a deep blue color.

The dried product analyzed as follows:

| | |
|---|---|
| Water sorption _____weight percent__ | 29.9 |
| Cyclohexane sorption _____do____ | 17.6 |
| Vanadium _____p.p.m__ | 1036 |
| Sodium _____weight percent__ | 12.9 |
| Alumina _____do____ | 35.8 |
| Silica _____do____ | 50.4 |
| Crystallinity (X-ray) (based on Linde 13X) percent__ | 100 |

A one gram sample of this material was placed in the reactor of a small scale glass unit and heated to 1000° F. while a stream of helium was passed over it after first having been passed through an adsorber containing n- hexane at room temperature. The chromatographic analysis of the products indicated the following:

| Component: | Wt. percent |
|---|---|
| Methane | 3.3 |
| Ethane+Ethylene | 6.8 |
| Propane | 4.6 |
| Propylene | 8.6 |
| n-Butane | 0.4 |
| Butene-1 | 1.9 |
| t-Butene-2 | 2.1 |
| e-Butene-2 | 1.7 |
| $C_5$–$C_6$ sum | 1.5 |
| n-Hexane | 69.0 |
| | 100.0 | n-Hexane conversion=31.0%, compared to a conversion of 10.3% for the control material (without added vanadium).

EXAMPLE 12

This example was similar to Example 8, except that a chromate solution was employed rather than a vanadate solution. The chromate solution was prepared by dissolving 1.1 grams potassium dichromate in 10 ml. deionized distilled water.

Analysis of the dried product indicated the following:

Water sorption _____weight percent__ 33.5
Cyclohexane sorption _____do____ 18.3
Chromium _____p.p.m__ 40

EXAMPLE 13

This example was similar to Example 12, except that a sodium chromate solution was employed rather than a potassium dichromate solution. 1.6 grams of sodium chromate (tetrahydrate) was added to the aluminate solution before filtration.

The product analyzed as follows:

Water sorption _____weight percent__ 32.2
Cyclohexane sorption _____do____ 18.2
Chromium _____p.p.m__ 20

EXAMPLE 14

This example was similar to Example 12, with the exception that a chromite reagent was employed rather than a potassium dichromate solution. The chromite solution was prepared as follows: sodium hydroxide (0.48 gram) and the chromium oxide (0.61 gram) were carefully fused in an evaporating dish. The resulting solids were slurried into 20 ml. deionized distilled water and placed in the reaction vessel prior to addition of the aluminate and silicate solutions.

After about 35 hours (allowed for crystallization) the product was collected by filtration, washed, and dried at 350° C. overnight. The yield was 22.0 grams. The product, when microscopically examined, appeared to have clumps of a yellow color on or in a white solid. This material analyzed as follows:

Water sorption _____weight percent__ 30.2
Cyclohexane sorption _____do____ 17.1
Chromium _____do____ 0.72

EXAMPLE 15

This example was similar to Example 12 except that rather than using potassium dichromate, 1.6 grams sodium chromate (tetrahydrate) in 10 ml. deionized distilled water were employed.

The resulting product analyzed as follows:

Water sorption _____weight percent__ 28.6
Cyclohexane sorption _____do____ 14.0
Chromium _____p.p.m__ 190

EXAMPLE 16

This example was similar to Example 15 except that 4.0 grams of sodium chromate (tetrahydrate) in 20 ml. deionized distilled water were used for chromate introduction into the reaction beaker.

Analysis of the dried product resulting from this preparation gave the following results:

Water sorption _____weight percent__ 31.6
Cyclohexane sorption _____do____ 18.7
Chromium _____p.p.m__less than 50

EXAMPLE 17

This example was similar to Example 16 with the exception that the reagent solution present in the reaction beaker before aluminate and silicate solution addition was composed of: 1.8 grams sodium molybate (dihydrate) in 15 ml. deionized distilled water.

The product analyzed as follows:

Water sorption _____weight percent__ 30.5
Cyclohexane sorption _____do____ 18.8
Molybdenum _____p.p.m__ 40

EXAMPLE 18

Aluminate and silicate solutions were prepared as described in Example 1. A reagent containing titanite was prepared by careful fusion of 0.48 gram sodium hydroxide pellets and 0.64 gram titanium dioxide. After the fusion mass had cooled, 20 ml. of deionized distilled water was added and the resulting slurry was added to the reaction beaker.

The crystalline aluminosilicate formed analyzed as follows:

Cyclohexane sorption _____weight percent__ 18.4
Titanium _____do____ 0.92
Sodium _____do____ 13.4
Alumina _____do____ 31.2
Silica _____do____ 49.6
Crystallinity (X-ray) (based on Linde 13X)
percent__ 100

EXAMPLE 19

This example was nearly identical to Example 18, except that the solids of the fusion were extracted with water and only the resulting aqueous solution was used.

Analysis of the material formed gave the following results:

Water sorption _____weight percent__ 31.8
Cyclohexane sorption _____do____ 18.2
Titanium _____p.p.m__ 600
Sodium _____weight percent__ 13.6
Alumina _____do____ 35.4
Silica _____do____ 49.6
Crystallinity (X-ray) (based on Linde 13X)
percent__ 90

Examples 20 to 25 illustrate the addition of a metal by utilization of a reagent containing the metal in cationic form (e.g. metal hydroxide). As in the preceding examples, the pores of the zeolite were approximately 13 angstroms in diameter.

EXAMPLE 20

A solution, prepared by dissolving 18.5 grams sodium aluminate (75% assay) in 150 ml. deionized distilled water, was filtered into a polypropylene beaker. In like manner, a solution containing 84.0 grams sodium metasilicate (nonahydrate) in 250 ml. deionized distilled water was prepared. These two solutions were poured together into a polypropylene beaker containing 1.4 grams ferric chloride in 20 ml. deionized distilled water. The resulting gel was stirred for several minutes and then allowed to stand at 100° C. until crystallization appeared to be complete (about 18 hours). The product was filtered from the reaction media, washed and dried as in the previous examples. The following analytical results were obtained:

Water sorption _____weight percent__ 31.9
Cyclohexane sorption _____do____ 17.0
Iron _____do____ 1.16
Crystallinity (X-ray) (based on Linde 13X)
                                         percent__ 95

Normal hexane was cracked over this material under the conditions described in Example 11. The analytical results are indicated below:

| Component: | Wt. percent |
|---|---|
| Methane | 4.0 |
| Ethane+ethylene | 3.2 |
| Propane | 2.5 |
| Propylene | 3.1 |
| Butene-1 | 0.4 |
| t-Butene-2 | 0.4 |
| e-Butene-2 | 0.2 |
| $C_5$–$C_6$ sum | 0.8 |
| n-Hexane | 85.4 |
|  | 100.0 | n-Hexane conversion=14.6%, compared to 10.3% for a control prepared without added iron.

EXAMPLE 21

This example was similar to Example 20, however only 0.3 gram ferric chloride was used. The dried material analyzed as follows:

Water sorption _____weight percent__ 31.2
Cyclohexane sorption _____do____ 17.9
Iron _____do____ 0.28
Sodium _____do____ 13.5
Alumina _____do____ 36.8
Silica _____do____ 49.7
Crystallinity (X-ray) (based on Linde 13X)
                                           percent__ 95

Oxidation of CO and n-butane over the material prepared in this example (using pulse technique described in Example 1) gave 12.5% $CO_2$ formation from CO and 11.6 from n-butane. This compared to 1.6% $CO_2$ and 1.5% $CO_2$ using a control containing no added metal.

EXAMPLE 22

This example utilized the procedure described in Example 20, however using the following solutions:

*Aluminate solution*

Sodium aluminate (75% assay) _____grams__ 18.5
Sodium hydroxide pellets _____do____ 1.0
Deionized distilled water _____ml__ 150

*Silicate solution*

Sodium metasilicate (nonahydrate) _____grams__ 84.0
Deionized distilled water _____ml__ 250

*Titanium solution*

Titanium trichloride solution (20%) _____grams__ 6.0

The resulting material analyzed as follows:

| | Wt. percent |
|---|---|
| Water sorption | 24.5 |
| Cyclohexane sorption | 14.1 |
| Titanium | 1.7 |
| Sodium | 12.8 |
| Alumina | 35.8 |
| Silica | 49.4 |

EXAMPLE 23

This example was similar to Example 20, however using as the solution present in the reaction beaker 2.0 grams nickelous chloride (hexahydrate) in 10 ml. deionized distilled water.

Analysis of the dried product gave the following results:

Water sorption _____weight percent__ 29.7
Cyclohexane sorption _____do____ 17.2
Nickel _____do____ 2.0
Sodium _____do____ 12.8
Alumina _____do____ 36.6
Silica _____do____ 46.8
Crystallinity (X-ray) (based on Linde 13X)
                                         percent__ 90

EXAMPLE 24

This example was similar to Example 20, however the reagents added to make the solution in the reaction beaker were: 0.2 grams cobalt chloride (hexahydrate) and 10 ml. deionized distilled water.

The dried material yielded the following analytical results:

Water sorption _____weight percent__ 30.4
Cyclohexane sorption _____do____ 17.4
Cobalt _____do____ 0.24
Sodium _____do____ 13.7
Alumina _____do____ 31.2
Silica _____do____ 49.2
Crystallinity (X-ray) (based on Linde 13X)
                                         percent__ 100

EXAMPLE 25

This example was similar to Example 24, with the exception that 0.3 gram chromium chloride (hexahydrate) was used in place of the cobalt chloride.

The product analyzed as follows:

| | Wt. percent |
|---|---|
| Water sorption | 30.2 |
| Cyclohexane sorption | 17.1 |
| Chromium | 0.14 |
| Sodium | 13.4 |
| Alumina | 35.7 |
| Silica | 48.9 |

Examples 26 through 39 illustrate the preparation of crystalline aluminosilicates of the 4A-type, i.e., having uniform pores approximately 4 angstroms in diameter, and containing various metals. Each metal was added as a metal anion present in solution during crystallization.

EXAMPLE 26

A solution was prepared in which 46.0 grams sodium aluminate (75% assay) along with 5.8 grams sodium hydroxide pellets were dissolved in 320 ml deionized distilled water. This solution was then filtered through a fluted filter paper into a polypropylene beaker. A second solution, prepared by dissolving 49 grams sodium metasilicate (nonahydrate) in 180 ml deionized distilled water, was treated in a like manner. A third solution containing 1.3 grams potassium permanganate in 15 ml deionized distilled water was placed in a polypropylene beaker used for the crystallization.

The two filtered solutions were poured rapidly together into the reaction beaker containing the permanganate. The resulting gel was stirred continuously for 3 hours at 100° C. The reaction mixture was cooled and filtered through a sintered glass funnel to collect product. The filter cake was washed with 1000 ml. deionized distilled water, removed from the filter, and placed in a muffle furnace at 350° C. for 17 hours. The dried product (24.15 grams) analyzed as follows:

Water sorption _____weight percent__ 26.5
Manganese _____p.p.m.__ 30

EXAMPLE 27

This example was similar to Example 26. A sodium manganate reagent was prepared in a manner identical to that described in Example 1. Filtration of the finished crystalline product was made through a #42 Whatman filter paper on a Buchner funnel rather than through a sintered glass funnel.

Analysis of dried product gave the following results:

| | |
|---|---|
| Water sorption _____weight percent__ | 25.1 |
| Manganese _____do____ | 0.42 |
| Crystallinity (X-ray) (based on Linde 4A) percent__ | 100 |

A sample of the material was tested for n-butane and CO oxidation using the pulse techniques described in Example 1. Oxidation of CO at 900° F. gave 10.8% $CO_2$ as compared to 4.0 for the control which contained no added metal (Linde 4A).

EXAMPLE 28

This example was similar to Example 26, except that 6.5 grams sodium permanganate (trihydrate) were used instead of potassium permanganate.

The dried product analyzed as follows:

| | |
|---|---|
| Water sorption _____weight percent__ | 25.5 |
| Manganese _____p.p.m.__ | 1000 |

Using the pulse technique described in Example 1, a sample of this material was tested for CO and n-butane oxidation. Oxidation of CO gave 12.5% $CO_2$ compared to 4.0% for the control; oxidation of n-butane was 4.0%, compared to 0.4% for the control.

EXAMPLE 29

This example was similar to Example 27, except that the following reagents were used in the preparation of the manganate solution:

| | |
|---|---|
| Manganese dioxide _____grams__ | 0.1 |
| Sodium hydroxide pellets _____do____ | 0.2 |
| Deionized distilled water _____ml__ | 10 |

The product, after the usual filtration, washing and drying to 350° C., analyzed as follows:

| | |
|---|---|
| Water sorption _____weight percent__ | 24.1 |
| Manganese _____do____ | 0.19 |
| Sodium _____do____ | 17.4 |
| Alumina _____do____ | 43.1 |
| Silica _____do____ | 41.4 |
| Crystallinity (X-ray) (based on Linde 4A) percent__ | 95 |

A portion of the crystalline aluminosilicate prepared in this example was examined for oxidation activity using the pulse technique described in Example 1. Oxidation of CO gave 9.4% $CO_2$ and oxidation of n-butane gave 0.6% $CO_2$. This compared to 4.0% and 0.4%, respectively, for the control.

EXAMPLE 30

A ferrate solution was prepared exactly as described in Example 5. The overall procedure was otherwise similar to Example 27. The finished product analyzed as follows:

| | |
|---|---|
| Water sorption _____weight percent__ | 25.3 |
| Iron _____do____ | 1.13 |
| Sodium _____do____ | 15.5 |
| Alumina _____do____ | 42.4 |
| Silica _____do____ | 39.4 |
| Crystallinity (X-ray) (based on Linde 4A) percent__ | 100 |

Crystalline aluminosilicate prepared in this example was tested, using the pulse method described in Example 1, for CO and n-butane oxidation. Oxidation of CO gave 12.0% $CO_2$ (compared to 4.0% for the control) while n-butane gave 7.8% $CO_2$ (compared to 0.4% for the control).

EXAMPLE 31

This example was a repetition of Example 30. The analysis of products was as follows:

| | |
|---|---|
| Water sorption _____weight percent__ | 26.0 |
| Iron _____do____ | 1.12 |

EXAMPLE 32

This example is similar to Example 26, except that a vanadate solution was employed rather than a potassium permanganate solution. The vanadate solution was prepared by dissolving 3.2 grams sodium orthovanadate hexadecahydrate in 10 ml. deionized distilled water.

The product analyzed as follows:

| | |
|---|---|
| Water sorption _____weight percent__ | 26.5 |
| Vanadium _____p.p.m.__ | 90 |

EXAMPLE 33

This example was similar to Example 26, except that a vanadite reagent was employed, rather than a potassium permanganate solution. The vanadite solution was prepared by treating 3.46 grams sodium orthovanadate (hexadecahydrate) in 25 ml. deionized distilled water with a stream of sulfur dioxide gas for 10 minutes at room temperature. The solution turned a deep blue color. This was used in the same manner as other "addition" reagents to yield a crystalline aluminosilicate which analyzed as follows:

| | |
|---|---|
| Water sorption _____weight percent__ | 23.5 |
| Vanadium _____p.p.m__ | 482 |
| Sodium _____weight percent__ | 15.3 |
| Alumina _____do____ | 42.0 |
| Silica _____do____ | 40.7 |
| Crystallinity (X-ray) (based on Linde 4A) percent__ | 100 |

EXAMPLE 34

The solution present in the crystallization vessel in this example was made by dissolving 2.1 grams sodium molybdate in 15 ml. deionized distilled water. In all other respects, this example was similar to Example 26. Analyses were as follows:

| | |
|---|---|
| Water sorption_____weight percent__ | 27.2 |
| Molybdenum _____p.p.m__ | 80 |

EXAMPLE 35

Sodium titanite reagent was prepared as described in Example 18. Otherwise this example was similar to Example 26. The product analyzed as follows:

| | |
|---|---|
| Water sorption_____weight percent__ | 24.6 |
| Titanium _____do____ | 0.65 |
| Sodium _____do____ | 15.9 |
| Alumina _____do____ | 42.8 |
| Silica _____do____ | 40.9 |
| Crystallinity (X-ray) (based on Linde 4A) percent__ | 110 |

EXAMPLE 36

This example was similar to Example 26, with the exception that a titanite solution was employed rather than a potassium permanganate solution. The titanite solution was prepared as described in Example 19.

The product analysis was as follows:

| | |
|---|---|
| Water sorption_____weight percent__ | 25.7 |
| Titanium _____p.p.m__ | 300 |
| Sodium _____weight percent__ | 16.4 |
| Alumina _____do____ | 36.4 |
| Silica _____do____ | 41.4 |
| Crystallinity (X-ray) (based on Linde 4A) percent__ | 110 |

EXAMPLE 37

This example was similar to Example 26, with the exception that 1.3 grams potassium dichromate in 15 ml. deionized distilled water were employed rather than a potassium permanganate solution.

The usual procedure yielded a product with the following analyses:

| | |
|---|---|
| Water sorption_____weight percent__ | 25.8 |
| Chromium _____p.p.m__ | 10 |

EXAMPLE 38

This example was similar to Example 26, however using a chromite reagent rather than a potassium permanganate solution. The chromite solution was prepared exactly as described in Example 14.

Analytical data for the dried product was as follows:

Water sorption _____ weight percent __ 11.7
Chromium _____ do ____ 0.81

NOTE.—Microscopic examination of this material revealed clumps of yellow colored material in or on white solids.

EXAMPLE 39

This example was similar to Example 38 except that 8.0 grams sodium chromate (tetrahydrate) were placed in the silicate solution prior to filtration, instead of in the crystallization beaker. Product analysis indicated the following:

Water sorption _____ weight percent __ 25.7
Chromium _____ p.p.m __ 70

Using a microreactor system, CO was oxidized with air (CO/air volume ratio—5/95) in the presence of a sample of the above material at 900° F. The conversion of CO to $CO_2$ was found to be 59.4% on a weight basis. The crystalline material, without any added chromium, gave, in two tests, 13.5% and 20% conversion under identical experimental conditions.

Examples 40 through 45 illustrate the preparation of crystalline aluminosilicates having uniform pores approximately 4 angstroms in diameter, wherein the metal added is present during crystallization in the form of a hydroxide (gel) of the metal.

EXAMPLE 40

A solution, prepared by dissolving 46.0 grams sodium aluminate (75% assay) and 8.8 grams sodium hydroxide pellets in 320 ml. deionized distilled water, was filtered through a fluted filter paper into a polypropylene beaker. In like manner, a solution containing 49.0 grams sodium metasilicate (nonahydrate) dissolved in 180 ml. deionized distilled water was prepared. These two solutions were poured together into a polypropylene beaker containing 1.4 grams ferric chloride in 20 ml. deionized distilled water. The resulting gel was stirred for 3 hours at 100° C., at which time the solids had settled. Those solids, which were of a tan color, were removed by filtration through a Whatman #42 paper on a polypropylene Buchner funnel. The filter cake was washed with 1000 ml. of deionized distilled water. The solids were heated in a muffle furnace for 18 hours at 350° C., yielding 25.3 grams of dried product. The analysis of this product was as follows:

Water sorption _____ weight percent __ 26.9
Iron _____ do ____ 1.11
Sodium _____ do ____ 16.2
Alumina _____ do ____ 41.4
Silica _____ do ____ 40.4
Crystallinity (X-ray) (based on Linde 4A)
    percent __ 90

EXAMPLE 41

This example was similar to Example 40, except that 6.0 grams of titanium trichloride were used instead of the ferric chloride solution. This product analyzed as follows:

Water sorption _____ weight percent __ 24.2
Titanium _____ do ____ 1.65
Sodium _____ do ____ 15.5
Alumina _____ do ____ 42.5
Silica _____ do ____ 39.0
Crystallinity (X-ray) (based on Linde 4A)
    percent __ 90

EXAMPLE 42

This example was similar to Example 40, however utilizing 2.1 grams chromium chloride (hexahydrate) dissolved in 10 ml. deionized distilled water, rather than the ferric chloride solution.

The finished product analyzed as follows:

Weight percent
Water sorption _____ 25.3
Chromium _____ 1.68
Sodium _____ 15.6
Alumina _____ 36.0
Silica _____ 40.5

EXAMPLE 43

This example was similar to Example 42, with the exception that only 0.3 gram chromium chloride dissolved in 10 ml. deionized distilled water was employed. Product analysis showed the following:

Water sorption _____ weight percent __ 25.8
Chromium _____ do ____ 0.13
Sodium _____ do ____ 15.8
Alumina _____ do ____ 42.3
Silica _____ do ____ 38.3
Crystallinity (X-ray) (based on Linde 4A)
    percent __ 100

EXAMPLE 44

This example was similar to Example 40, however utilizing a nickelous chloride solution rather than the ferric chloride solution. The nickelous chloride solution was prepared exactly as described in Example 23. Product analysis was as follows:

Water sorption _____ weight percent __ 24.8
Nickel _____ do ____ 2.0
Sodium _____ do ____ 15.2
Alumina _____ do ____ 44.0
Silica _____ do ____ 39.3
Crystallinity (X-ray) (based on Linde 4A)
    percent __ 95

EXAMPLE 45

This example was similar to Example 40, however a cobalt chloride solution was employed rather than the ferric chloride solution. The cobalt solution was prepared exactly as described in Example 24. The product analyzed as follows:

Weight percent
Water sorption _____ 26.0
Cobalt _____ 0.37
Sodium _____ 15.8
Alumina _____ 43.0
Silica _____ 40.6

Examples 46 through 51 illustrate the preparation of aluminosilicates having uniform pores of about 4 angstroms in diameter in which a portion of the sodium aluminate reagent (usually ½) is replaced by an equal molar amount of a salt containing the metal to be added, with such metal in the anionic portion of the molecule.

EXAMPLE 46

A solution containing 23.0 grams sodium aluminate (75% assay), 5.8 grams sodium hydroxide pellets, and 109 grams sodium orthovanadate in 320 ml. deionized distilled water, was filtered through a fluted filter paper into a polypropylene beaker. A second solution was prepared in the same manner except that it contained 49.0 grams sodium metasilicate (nonahydrate) in 180 ml. deionized distilled water. These two solutions were mixed together and the resulting gel was stirred for 3½ hours at 100° C.

At the end of this time crystalline material had formed and was removed by filtration through a Buchner funnel #42 Whatman paper. The solids were washed with 1000 ml. deionized distilled water and then placed in a muffle furnace for 24 hours at 350° C. Analysis of this product (yield=22.88 grams) was as follows:

| | | |
|---|---|---|
| Water sorption | weight percent | 23.9 |
| Vanadium | do | 0.28 |
| Sodium | do | 15.5 |
| Alumina | do | 41.0 |
| Silica | do | 42.3 |
| Crystallinity (X-ray) (based on Linde 4A) | percent | 95 |

EXAMPLE 47

A solution prepared by dissolving 23.0 grams sodium aluminate (75% assay) and 5.8 grams sodium hydroxide pellets in 320 ml. deionized distilled water was filtered into a polypropylene beaker. A like procedure was used in preparing a solution of 49.0 grams sodium metasilicate (nonahydrate) in 180 ml. deionized distilled water.

A ferrate reagent was prepared by the method described in Example 5 but using 60 grams sodium hydroxide pellets, 4.2 grams ferric chloride, and 120 ml. deionized distilled water. The remainder of the procedure was as described in Example 46.

The dried product, 23.48 grams of tan colored solids, analyzed as follows:

| | | |
|---|---|---|
| Water sorption | weight percent | 22.5 |
| Iron | do | 3.89 |
| Sodium | do | 14.7 |
| Alumina | do | 42.3 |
| Silica | do | 40.2 |
| Crystallinity (X-ray) (based on Linde 4A) | percent | 75 |

EXAMPLE 48

This example was similar to Example 47, with the exception that the ferrate solution was prepared as described in Example 5 from 5.0 grams sodium hydroxide pellets, 0.4 gram ferric chloride, and 10 ml. deionized distilled water.

Instead of the usual amount of sodium metasilicate, 44.5 grams were used.

The product was analyzed as follows:

| | | |
|---|---|---|
| Water sorption | weight percent | 24.4 |
| Iron content | do | 0.36 |

EXAMPLE 49

This example was similar to Example 46, except that the sodium vanadate was replaced by 65.4 grams sodium molybdate (dihydrate).

The product analyses were as follows:

| | | |
|---|---|---|
| Water sorption | weight percent | 24.6 |
| Molybdenum | p.p.m. | 700 |
| Sodium | weight percent | 15.6 |
| Alumina | do | 41.2 |
| Silica | do | 42.7 |

EXAMPLE 50

This example was similar to Example 46, with the exception that the sodium chromate (tetrahydrate) (62.5 grams) was added in the aluminate solution.

The product analyzed as follows:

| | | |
|---|---|---|
| Water sorption | weight percent | 24.2 |
| Chromium | p.p.m. | 300 |

EXAMPLE 51

This example was similar to Example 50, except that the sodium chromate was replaced by 52.3 grams sodium permanganate (trihydrate).

The analyses of the product yielded the following results:

| | | |
|---|---|---|
| Water sorption | weight percent | 23.3 |
| Manganese | do | 0.62 |
| Sodium | do | 15.6 |
| Alumina | do | 42.0 |
| Silica | do | 41.6 |
| Crystallinity (X-ray) (based on Linde 4A) | percent | 75 |

EXAMPLE 52

This example illustrates the method of preparing a zeolitic composition characterized by a uniform structure made up of pores approximately 5 angstroms in diameter but containing no platinum.

One hundred and six grams of sodium aluminate were dissolved in 375 milliliters of water by heating. One hundred fifty-four grams of sodium metasilicate were dissolved in 375 ml. of water by heating. The silicate solution was added to the aluminate solution at room temperature and a white precipitate formed immediately. The mixture was stirred under reflux conditions at a temperature of approximately 102° C. for 7 hours and then filtered. After being washed with water, the solid was shown by X-ray diffraction to be a crystalline material characterized by uniform pores approximately 4 angstroms in diameter. This product was washed with calcium chloride solution to convert it from the sodium form to the calcium form of the zeolite, the latter being characterized by uniform pores approximately 5 angstroms in diameter. The solid was then washed with water until free of chloride ion and X-ray diffraction showed the solid to be characterized by a uniform structure made up of pores of approximately 5 angstroms in diameter. This product was dried at 800° F. in air before use.

EXAMPLE 53

This example illustrates the preparation of a crystalline zeolite characterized by a uniform pore structure of about 5 angstroms in diameter prepared in the presence of a platinous compound.

Seventy-eight grams of sodium aluminate and 113 grams of sodium metasilicate were separately dissolved in 275 ml. portions of water. Platinous ammine chloride, i.e., $Pt(NH_3)_4Cl_2$ in an amount of 0.55 gram was dissolved in 70 ml. of water and added to the sodium aluminate solution. The latter was then mixed with the silicate solution. A resulting white precipitate formed. The mixture was then stirred under reflux conditions at a temperature of about 102° C. for 7 hours and filtered. After being washed with water, the crystalline material was washed with calcium chloride solution to convert it from the sodium form to the calcium form characterized by a uniform structure made up of pores approximately 5 angstroms in diameter. The solid was then washed with water until free of chloride ion, calcined 2 hours in air at 800° F. and thereafter in hydrogen for 2 hours at 800° F. The crystalline zeolite product had a platinum content of 0.31 percent by weight.

EXAMPLE 54

This example illustrates the preparation of a crystalline zeolite characterized by a uniform pore structure of about 5 angstroms in diameter prepared in the presence of a platinic compound.

One hundred-six grams of sodium aluminate were dissolved in 375 ml. of water by heating. One hundred fifty-four grams of sodium metasilicate were dissolved in 375 ml. of water by heating. Two hundred ml. of platinic amine chloride were added to the aluminate solution. The latter was then mixed with the silicate solution. A resulting white precipitate formed. The mixture was then stirred under reflux conditions at a temperature of approximately 102° C. for 7 hours and filtered. After being washed with water the solid was washed with calcium chloride solution to convert it from the sodium form to the calcium form. The resulting product was dried and calcined for 2 hours in air at 800° F. followed by heating for 2 hours in hydrogen at 800° F. The resulting crystalline product had a platinum content of 0.023 percent by weight.

EXAMPLE 55

This example illustrates the preparation of a composition comprising Molecular Sieve 5A impregnated with a platinic compound.

A quantity of Molecular Sieve 5A was washed with water until free of alkali. A 4.1 gram sample of the washed material was mixed with 50 ml. of platinic ammine chloride solution. The mixture was refluxed for 8 hours at a temperature of approximately 102° C. and then washed with water until free of chloride. The material after drying was calcined for 2 hours in air at 800° F. followed by heating for 2 hours in hydrogen at 800° F. The resulting product had a platinum content of 0.39 percent by weight.

EXAMPLE 56

This example illustrates the preparation of a standard platinum-silica hydrogenation catalyst.

Silica gel having a particle size of ⅜-inch mesh (Tyler) and a surface area of 667 m.²/gram was heat treated for 2 hours at 1200° F. in air and then 16 hours at 1000° F. in air. A 200 cc. batch of the treated gel was spray-impregnated with a solution of aluminum nitrate and chloroplatinic acid calculated to add 0.06 percent by weight of $Al_2O_3$ and 0.36 percent by weight of platinum to the base. The solution before spraying was diluted to a volume calculated to just fill the pores of the base.

The impregnated base was wet-aged by heating overnight in an oven at 230° F. After this treatment, the catalyst was heated in flowing nitrogen to 450° F., reduced 2 hours at 450° F. in hydrogen and the temperature was then raised to 950° F. and held for 2 hours in hydrogen. The finished catalyst was permitted to cool under nitrogen and analyzed 0.35 percent by weight of platinum, 0.107 percent by weight $Al_2O_3$ and had a surface area of 548–585 m.²/gram.

The above catalysts (Examples 52–56) were subjected to an activity test. Such test involved passage of a hydrogen-hydrocarbon gas stream over a sample of the catalyst and analysis of the resulting product. The test was carried out at room temperature employing as the hydrocarbon gas n-butene-1, isobutene or a mixture of these gases. The gas flow rate involved was 50 ml. per minute for each gas; thus if the hydrocarbon mixture is used the flow rate was 50 ml. per minute for hydrogen and 50 ml. per minute for each butene. The time between the first contact of hydrocarbon with catalyst and product sampling was 10–15 minutes. The catalyst had a particle size of less than 100 mesh.

The activities of the catalysts of Examples 52–56 are set forth in Table I below:

TABLE I

| Ex. | Percent Pt | Catalyst Wt., g. | Charge [1] | Conversion, Percent [2] | |
|---|---|---|---|---|---|
| | | | | n-butene-1 | i-butene |
| 52 | 0.0 | 1.129 | E | 0 | 0 |
| 53 | 0.31 | 0.2717 | M | 22 | 0 |
| 54 | 0.023 | 0.3959 | E | 85 | 53 |
| 55 | 0.39 | 0.3849 | M | 46 | 49 |
| 56 | 0.35 | 0.0384 | M | 47 | 20 |

[1] M=mixture of n-butene-1 and i-butene; E=each butene charged separately, and one of the two runs is therefore on a catalyst used about 20 minutes.
[2] Percentage of each isomer converted to the corresponding paraffin It will be seen from the foregoing data that the catalyst of Example 52 which contained no platinum was not catalytically active under the conditions of the above-described test. The catalyst of Example 53 was catalytically selective in effecting conversion of normal butene to the exclusion of iso-butene. The catalyst of Example 54 prepared by a method similar to that for the catalyst of Example 53 but in which a platinic ammine chloride solution was used instead of a platinous ammine chloride solution, exhibited high catalytic activity but did not show the marked catalytic selectivity of the catalyst of Example 53. The catalyst of Example 55 gave hydrogenation results typical of the catalysts which were made not by coprecipitation, but by impregnation, of a 5A molecular sieve material with a solution containing platinum in the platinic form. This catalyst exhibited no selectivity and it appeared that essentially all of the platinum was deposited on the surface of the molecular sieve material and not within the crystals where it would be shielded. The catalyst of Example 56 is a standard platinum-silica hydrogenation catalyst and is included to show that the hydrogenation rates of the two butenes are not very different when platinum is supported on an inert non-selective base.

EXAMPLE 57

This example illustrates the preparation of a crystalline zeolite characterized by a uniform pore structure of about 5 angstroms in diameter prepared in the presence of a copper compound, which zeolite contains metallic copper.

78 grams of sodium aluminate and 113 grams of sodium metasilicate are separately dissolved in 275 ml. portions of water. The ethylenediamine complex is copper, i.e., prepared by dissolving 2.5 grams of $CuSO_4 \cdot 5H_2O$ in 70 ml. water and 1.25 grams of pure ethylenediamine is added to the sodium aluminate solution. The latter is then mixed with the silicate solution to thereby form a precipitate. The mixture is then stirred under reflux conditions at a temperature of about 102° C. for 7 hours and filtered. After being washed with water, the crystalline material is washed with calcium chloride solution to convert it from the sodium form to the calcium form characterized by a uniform structure made up of pores approximately 5 angstroms in diameter. The solid is then washed with water until free of chloride ion, calcined two hours in air at 800° F. and thereafter in hydrogen for two hours at 900° F. There results a crystalline zeolite product containing dispersed in the pores thereof copper in metallic form.

EXAMPLE 58

The procedure described in Example 53 was followed, but on a larger scale so as to produce a calculated yield of about 400 grams of dried product. After crystallization but before washing, the crystals were filtered and a sample taken for analysis.

The filter cake was slurried with 150 grams NaCl in one liter of distilled water plus a trace (1 ml.) of concentrated $NH_4OH$, and filtered. This procedure was repeated six times, and was followed by a water rinse. A sample analyzed at this point contained 0.3 weight percent platinum. A 75 gram portion of the wet filter cake was slurried in 200 cc. distilled water to which had been added 35 grams calcium acetate monohydrate. The whole was permitted to stand for about one-half hour and thereafter the solids were filtered off. This exchange procedure was repeated four times to exchange calcium ions for sodium ions. The filtercake was rinsed, dried, and analyzed. It contained 0.3 weight percent platinum.

Another 75 grams portion of wet filter cake was treated with potassium chloride to exchange potassium ions for sodium ions. Analysis of the exchanged aluminosilicate showed 0.3 weight percent platinum.

The foregoing shows that the platinum cations introduced into the cavities of the "A" crystalline aluminosilicate do not exchange in spite of exhaustive treatment with amounts of electrolyte sufficient to remove the sodium ion.

EXAMPLE 59

A preparation was made in exactly the same manner as the preparation described in Example 30, except that the filtered catalyst sodium zeolite was extensively exchanged with aqueous calcium chloride. The product was then washed, dried and calcined. Analysis showed that substantially all of the sodium had exchanged for calcium but that the iron content was essentially unaffected. The analysis found was:

|   | Percent |
|---|---|
| Water sorption | 18.7 |
| Iron content | 0.86 |
| Sodium | 0.55 |
| Calcium | 13.7 |
| Alumina | 43.6 |
| Silica | 41.1 |

It is to be understood that the above description is merely illustrative of preferred embodiments of the invention, of which many variations may be made within the scope of the following claims by those skilled in the art without departing from the spirit thereof.

Having thus described our invention, what we desire to secure and claim by Letters Patent is:

1. A catalyst consisting essentially of a crystalline aluminosilicate characterized by rigid three-dimensional networks and uniform pores not in excess of about 6 angstroms in diameter and containing therein a minor amount of a metal, ions of said metal, or mixtures thereof, said metal being one capable of forming a Werner complex of the formula $$[(M^n)a_x b_y c_z d_w]^m$$

wherein
M is the metal,
$n$ is the valence state of the metal and is an integer from $+1$ to $+6$,
$a$, $b$, $c$, and $d$ are coordinated groups,
$x$, $y$, $z$, and $w$ are integers from zero to 8, the sum of $x$, $y$, $z$, and $w$ being not in excess of 8, and
$m$ is the electrostatic charge of the complex, said aluminosilicate having resulted from the growth of crystals of said aluminosilicate from an aqueous medium containing a water-soluble compound of said metal.

2. The catalyst of claim 1 wherein said metal is in the form of a complex metal anion, the metal portion thereof being selected from the group consisting of platinum, iron, manganese, cobalt, molybdenum, vanadium, chromium and titanium.

3. The catalyst of claim 1 wherein said pores are from about 4 to 5 angstroms in diameter and wherein said metal within said catalyst is platinum in the form of platinum metal.

4. The catalyst of claim 1 wherein said pores are from about 4 to 5 angstroms in diameter and wherein said metal within said catalyst is palladium in the form of palladium metal.

5. The catalyst of claim 1 wherein said pores are from about 4 to 5 angstroms in diameter and wherein said metal within said catalyst is vanadium in the form of vanadium metal.

6. The catalyst of claim 1 wherein said pores are from about 4 to 5 angstroms in diameter and wherein said metal within said catalyst is chromium in the form of chromium metal.

7. The catalyst of claim 1 wherein said pores are from about 4 to 5 angstroms in diameter and wherein said metal within said catalyst is molybdenum in the form of molybdenum metal.

8. The catalyst of claim 1 wherein the content of said metal in the resulting crystalline aluminosilicate, expressed in terms of metal, is from about 0.001 to 5 percent by weight.

References Cited
UNITED STATES PATENTS

| | | | |
|---|---|---|---|
| 1,840,450 | 1/1932 | Jaeger et al. | 252—454 |
| 1,920,795 | 8/1933 | Jaeger | 252—455 X |
| 2,971,904 | 2/1961 | Gladrow et al. | 252—455 X |
| 2,983,670 | 5/1961 | Seubold | 252—455 X |
| 3,200,082 | 8/1965 | Breck et al. | 252—455 |
| 3,200,083 | 8/1965 | Milton | 252—455 |

DANIEL E. WYMAN, *Primary Examiner.*

OSCAR R. VERTIZ, EDWARD J. MEROS, *Examiners.*

C. F. DEES, *Assistant Examiner.*